(12) United States Patent
Witt

(10) Patent No.: US 6,332,187 B1
(45) Date of Patent: *Dec. 18, 2001

(54) CUMULATIVE LOOKAHEAD TO ELIMINATE CHAINED DEPENDENCIES

(75) Inventor: David B. Witt, Austin, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/802,785

(22) Filed: Mar. 8, 2001

Related U.S. Application Data

(63) Continuation of application No. 09/190,809, filed on Nov. 12, 1998, now Pat. No. 6,240,503.

(51) Int. Cl.[7] .................................................. G06F 9/30
(52) U.S. Cl. ............................ 712/23; 712/1; 712/214; 711/200; 711/204; 711/213
(58) Field of Search ..................... 712/1, 23, 222, 712/214; 711/100, 117, 118, 137, 200, 202, 203, 204, 213; 708/300, 306, 490

(56) References Cited

U.S. PATENT DOCUMENTS

| | | | |
|---|---|---|---|
| 5,233,696 | 8/1993 | Suzuki | 712/204 |
| 5,345,569 | 9/1994 | Tran | 712/217 |
| 5,408,609 | 4/1995 | Malgogne et al. | 709/228 |
| 5,574,935 | 11/1996 | Vidwans et al. | 712/23 |
| 5,623,628 | 4/1997 | Brayton et al. | 711/141 |
| 5,632,023 | 5/1997 | White et al. | 712/218 |
| 5,696,955 * | 12/1997 | Goddard et al. | 712/222 |
| 5,768,610 * | 6/1998 | Pflum | 712/23 |
| 5,857,089 | 1/1999 | Goddard et al. | 712/222 |
| 6,061,786 | 5/2000 | Witt | 712/237 |
| 6,094,716 | 7/2000 | Witt | 712/23 |
| 6,240,503 * | 5/2001 | Witt | 712/23 |

FOREIGN PATENT DOCUMENTS

| | | |
|---|---|---|
| 0 518 469 | 12/1992 | (EP). |
| 0 851 343 | 7/1998 | (EP). |

* cited by examiner

Primary Examiner—Meng-Al T. An
Assistant Examiner—Wen-Tai Lin
(74) Attorney, Agent, or Firm—Conley, Rose & Tayon, PC; Lawrence J. Merkel

(57) ABSTRACT

A processor is configured to generate lookahead values using a cumulative constant. The processor classifies operations to a particular register (e.g. the stack pointer register, or ESP in an embodiment employing the x86 instruction set architecture) as either accelerated or non-accelerated. For example, instructions which are defined to increment/decrement the particular register by an explicit or implicit constant value may be accelerated operations. Upon the occurrence of a non-accelerated operation, the processor may begin accumulating the cumulative effect of accelerated operations to the result of the non-accelerated operation as a cumulative offset. The result of the non-accelerated operation (upon execution thereof) may then be added to the cumulative offset values corresponding to each accelerated operation to generate the particular register value corresponding to that accelerated operation. Accordingly, dependencies upon the register due to the accelerated operations may be alleviated. Accelerated operations may execute in parallel upon provision of the value generated by the non-accelerated operations.

25 Claims, 6 Drawing Sheets

CUMULATIVE LOOKAHEAD TO ELIMINATE CHAINED DEPENDENCIES

This application is a continuation of U.S. patent application Ser. No. 09/190,809 filed Nov. 12, 1998 now U.S. Pat. No. 6,240,503.

BACKGROUND OF THE INVENTION

1. Field of the Invention

This invention is related to the field of processors and, more particularly, to mechanisms for enhancing parallelism within processors.

2. Description of the Related Art

Superscalar processors attempt to achieve high performance by simultaneously executing multiple instructions in a clock cycle and by specifying the shortest possible clock cycle consistent with the design. As used herein, the term "clock cycle" refers to an interval of time during which the pipeline stages of a processor perform their intended functions. For example, superscalar processors are typically configured with instruction processing pipelines which process instructions. The processing of instructions includes the actions of fetching, dispatching, decoding, executing, and writing back results. Each action may be implemented in one or more pipeline stages, and an instruction flows through each of the pipeline stages where an action or portion of an action is performed. At the end of a clock cycle, the instruction and the values resulting from performing the action of the current pipeline stage are moved to the next pipeline stage. When an instruction reaches the end of an instruction processing pipeline, it is processed and the results of executing the instruction have been recorded.

A problem associated with executing a large number of instructions concurrently is that instructions often have dependencies on instructions prior to them in program order. As used herein, the term "dependency" or "dependent" refers to the condition in which an instruction receives the result of executing a previous instruction as one of its operands. In other words, the dependent instruction operates on the result of the previous instruction. Generally speaking, instructions which are dependent on a previous instruction do not execute in parallel with that previous instruction. Instead, the previous instruction executes, the result is forwarded to the dependent instruction, and the dependent instruction executes in a subsequent clock cycle.

In many cases, instruction dependencies limit the number of instructions which may be executed in a given clock cycle. It is not uncommon in programs for a particular instruction to be dependent on an instruction immediately prior to the particular instruction or to be dependent on an instruction two instructions prior to the particular instruction. Further, it is not uncommon in programs for a majority of the instructions to be dependent in this way. This type of program severely limits the number of instructions which may be executed concurrently.

While a problem in any instruction set, programs written using the x86 instruction set (also referred to as IA-32 or APX) frequently are even more sensitive to the problem of dependencies limiting parallelism. For example, due to the relatively small number of registers available in the x86 instruction set, many operands are stored on a memory stack pointed to by the ESP register. Accordingly, the ESP is an operand of many instructions. Furthermore, many instructions update the ESP register as well (e.g. pushing and popping values on the stack). Accordingly, instructions may exhibit a chain of dependencies on the ESP register, limiting overall concurrent execution. Other instruction sets may not specify a dedicated stack pointer register such as ESP, but software may employ a stack model in which a register is used as a stack pointer register. Such a model may exhibit chained dependencies as well.

As used herein, an "operand" is a value operated upon by an instruction. Source operands are input values to be operated upon in response to the instruction to produce a result, which is the destination operand. Operands may be register operands if they are stored in registers internal to the processor, or memory operands if they are stored in a memory location external to the processor. Register operands are specified by a register address which may be directly encoded in the instruction or may be implicit in the definition of the instruction assigned to a particular opcode. Memory operands are specified by a memory address which may be specified via one or more address operands of the instruction (e.g. a displacement coded into the instruction, one or more register operands, etc.).

SUMMARY OF THE INVENTION

The problems outlined above are in large part solved by a processor configured to generate lookahead values using a cumulative constant. The processor classifies operations to a particular register (e.g. the stack pointer register, or ESP in an embodiment employing the x86 instruction set architecture) as either accelerated or non-accelerated. For example, instructions which are defined to increment/decrement the particular register by an explicit or implicit constant value may be accelerated operations. Upon the occurrence of a non-accelerated operation, the processor may begin accumulating the cumulative effect of accelerated operations to the result of the non-accelerated operation as a cumulative offset. The result of the non-accelerated operation (upon execution thereof) may then be added to the cumulative offset values corresponding to each accelerated operation to generate the particular register value corresponding to that accelerated operation. Accordingly, dependencies upon the register due to the accelerated operations may be alleviated. Accelerated operations may execute in parallel upon provision of the value generated by the non-accelerated operations. The cumulative value may be maintained across multiple cycles of instruction dispatch, thereby allowing for dependency alleviation across the multiple cycles of instruction dispatch. Performance of the processor may be increased due to the alleviation of dependencies due to the particular register.

Broadly speaking, in one embodiment a processor is contemplated. The processor comprises a lookahead unit and a second unit. The lookahead unit is configured to detect an instruction having a particular register as an operand. The lookahead unit is configured to generate a constant corresponding to the instruction, wherein the constant is indicative of a modification of a value stored into the particular register in response to executing a previous instruction. The lookahead unit is configured to generate the constant responsive to: (i) a cumulative offset maintained by the lookahead unit, the cumulative offset reflecting a cumulative modification of the value due to each instruction between the previous instruction and the instruction; and (ii) a modification due to the instruction. Coupled to the lookahead unit, the second unit is configured to combine the constant with the value to generate the operand.

In another embodiment, a method for enhancing parallelism in a processor is contemplated. A particular instruction defined to generate a value for storage into a particular register is executed. A cumulative offset reflecting a cumulative modification to the value is maintained. The cumulative modification is due to one or more instructions subsequent to the particular instruction. A constant corresponding to a first instruction is generated responsive to the cumulative offset and a modification of the value due to the first instruction.

In yet another embodiment, a computer system is contemplated. The computer system comprises a processor and an input/output (I/O) device. The processor includes a lookahead unit and a second unit. The lookahead unit is configured to detect an instruction having a particular register as an operand. The lookahead unit is configured to generate a constant corresponding to the instruction, wherein the constant is indicative of a modification of a value stored into the particular register in response to executing a previous instruction. The lookahead unit is configured to generate the constant responsive to: (i) a cumulative offset maintained by the lookahead unit, the cumulative offset reflecting a cumulative modification of the value due to each instruction between the previous instruction and the instruction; and (ii) a modification due to the instruction. Coupled to the lookahead unit, the second unit is configured to combine the constant with the value to generate the operand. Coupled to the processor, the I/O device configured to communicate between the computer system and another computer system to which the I/O device is coupled.

BRIEF DESCRIPTION OF THE DRAWINGS

Other objects and advantages of the invention will become apparent upon reading the following detailed description and upon reference to the accompanying drawings in which.

Figure 1:
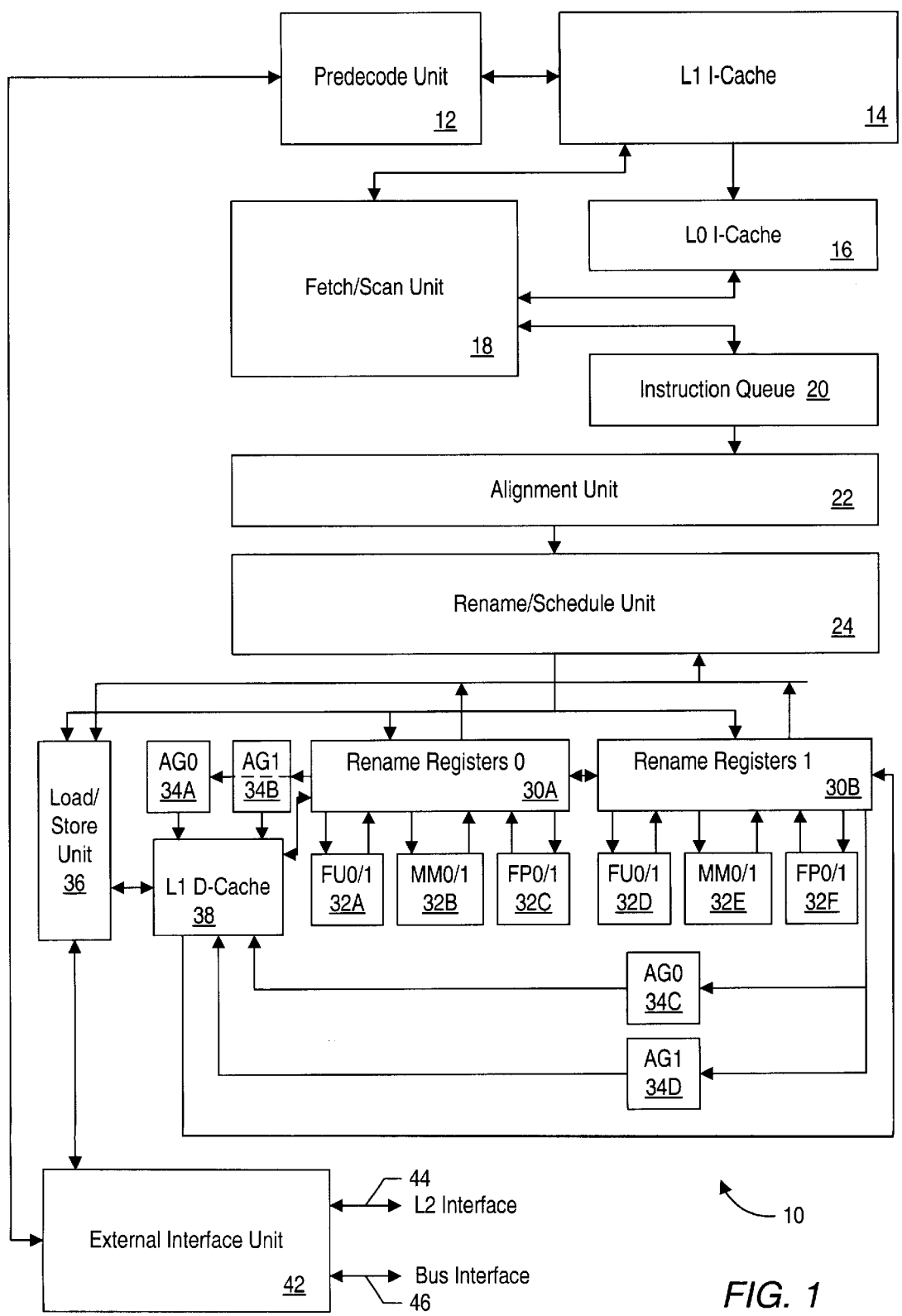
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a superscalar processor 10 is shown. Other embodiments are possible and contemplated. In the embodiment shown in FIG. 1, processor 10 includes a predecode unit 12, an L1 I-cache 14, an L0 I-cache 16, a fetch/scan unit 18, an instruction queue 20, an alignment unit 22, a rename/schedule unit 24, a first rename register file 30A, a second rename register file 30B, a plurality of functional units 32A, 32B, 32C, 32D, 32E and 32F, a plurality of address generation units 34A, 34B, 34C, and 34D, a load/store unit 36, an L1 D-cache 38, and an external interface unit 42. Elements referred to herein by a particular reference number followed by various letters will be collectively referred to using the reference number alone. For example, functional units 32A–32F will be collectively referred to as functional units 32.

In the embodiment of FIG. 1, external interface unit 42 is coupled to predecode unit 12, load/store unit 36, an L2 interface 44, and a bus interface 46. Predecode unit 12 is further coupled to L1 I-cache 14. L1 I-cache 14 is coupled to L0 I-cache 16 and to fetch/scan unit 18. Fetch/scan unit 18 is also coupled to L0 I-cache 16 and to instruction queue 20. Instruction queue 20 is coupled to alignment unit 22, which is flirter coupled to rename/schedule unit 24. Rename/schedule unit 24 is further coupled to first rename register file 30A, second rename register file 30B, and load/store unit 36. Load/store unit 36 is coupled to L1 D-cache 38. First rename register file 30A is coupled to functional units 32A–32C and to address generation units 34A–34B, as well as to L1 D-Cache 38. Similarly, second rename register file 30B is coupled to functional units 32D–32F and address generation units 34C–34D, as well as to L1 D-Cache 38. Address generation units 34A–34D are coupled to L1 D-Cache 38.

Generally speaking, processor 10 attempts to generate lookahead values for the stack pointer register to remove dependencies which result from the stack pointer register. Many instructions increment or decrement the stack pointer register by a fixed value, or by a value included in the instruction (e.g. an immediate field). Processor 10 calculates the cumulative effects of these manipulations prior to a particular instruction in order to calculate a lookahead value for the stack pointer register which corresponds to that particular instruction. Advantageously, instructions which are dependent upon other instructions only for the value of the stack pointer may be executed in parallel. Certain updates to the stack pointer register may not be accelerated by processor 10. Upon detection of such an update, processor 10 may stall subsequent instructions until the non-accelerated update has completed. Subsequently, lookahead value generation may be continued.

Processor 10 may classify operations to the stack pointer register as either accelerated or non-accelerated. Generally, an accelerated operation is an operation which may be resolved using dedicated hardware. The hardware may be employed prior to executing the instruction defining the operation. For example, instructions which are defined to increment/decrement the stack pointer register by an explicit or implicit constant value may be accelerated operations. Other embodiments may select more or fewer operations as accelerated operations, as desired. Non-accelerated operations are operations which may not be resolved prior to executing the instruction defining the operation. Upon the occurrence of a non-accelerated operation, processor 10 may begin accumulating the cumulative effect of accelerated operations to the result of the non-accelerated operation. The result of the non-accelerated operation (upon execution thereof) may then be added to the cumulative value corresponding to each accelerated operation to generate the stack pointer register value corresponding to that accelerated operation.

Predecode unit 12 receives instruction bytes fetched by external interface unit 42 and predecodes the instruction bytes prior to their storage within L1 I-cache 14. Predecode information generated by predecode unit 12 is stored in L1 I-cache 14 as well. Generally, predecode information is provided to aid in the identification of instruction features which may be useful during the fetch and issue of instructions but which may be difficult to generate rapidly during the fetch and issue operation. The term "predecode", as used herein, refers to decoding instructions to generate predecode information which is later stored along with the instruction bytes being decoded in an instruction cache (e.g. L1 I-cache 14 and/or L0 I-cache 16).

In one embodiment, processor 10 employs two bits of predecode information per instruction byte. One of the bits, referred to as the "start bit", indicates whether or not the instruction byte is the initial byte of an instruction. When a group of instruction bytes is fetched, the corresponding set of start bits identifies the boundaries between instructions within the group of instruction bytes. Accordingly, multiple instructions may be concurrently selected from the group of instruction bytes by scanning the corresponding start bits. While start bits are used to locate instruction boundaries by identifying the initial byte of each instruction, end bits could alternatively be used to locate instruction boundaries by identifying the final byte of each instruction.

The second predecode bit used in this embodiment, referred to as the "control transfer" bit, identifies which instructions are branch instructions. The control transfer bit corresponding to the initial byte of an instruction indicates whether or not the instruction is a branch instruction. The control transfer bit corresponding to subsequent bytes of the instruction is a don't care except for relative branch instructions having a small displacement field. According to one particular embodiment, the small displacement field is an 8 bit field. Generally, a "small displacement field" refers to a displacement field having fewer bits than the target address generated by branch instructions. For relative branch instructions having small displacement fields, the control transfer bit corresponding to the displacement byte is used as described below.

In addition to generating predecode information corresponding to the instruction bytes, predecode unit 12 is configured to recode the displacement field of relative branch instructions to actually store the target address in the present embodiment. In other words, predecode unit 12 adds the displacement of the relative branch instruction to the address corresponding to the relative branch instruction as defined by the instruction set employed by processor 10. The resulting target address is encoded into the displacement field as a replacement for the displacement, and the updated displacement field is stored into L1 I-cache 14 instead of the original displacement field. Target address generation is simplified by precomputing relative target addresses, and hence the branch prediction mechanism may operate more efficiently.

In one embodiment of processor 10 which employs the x86 instruction set, predecode unit 12 is configured to recode eight bit and 32 bit displacement fields. The 32 bit displacement fields may store the entirety of the target address. On the other hand, the eight bit displacement field is encoded. More particularly, the eight bit displacement field and corresponding control transfer predecode bit is divided into a cache line offset portion and a relative cache line portion. The cache line offset portion is the cache line offset portion of the target address. The relative cache line portion defines the cache line identified by the target address (the "target cache line") in terms of a number of cache lines above or below the cache line storing the relative branch instruction.

A first cache line is above a second cache line if each byte within the first cache line is stored at an address which is numerically greater than the addresses at which the bytes within the second cache line are stored. Conversely, a first cache line is below the second cache line if each byte within the first cache line is stored at an address which is numerically less than the addresses which the bytes within a second cache line are stored. A signed eight bit displacement specifies an address which is +/−128 bytes of the address corresponding to the branch instruction. Accordingly, the number of above and below cache lines which can be reached by a relative branch instruction having an eight bit displacement is limited. The relative cache line portion encodes this limited set of above and below cache lines.

Tables 1 and 2 below illustrates an exemplary encoding of the predecode information corresponding to a byte in accordance with one embodiment of processor 10.

TABLE 1

Predecode Encoding

| Start Bit | Control Transfer Bit | Meaning |
|---|---|---|
| 1 | 0 | Start byte of an instruction which is not a branch. |
| 1 | 1 | Start byte of a branch instruction. |
| 0 | x | Not an instruction boundary. Control Transfer Bit corresponding to displacement is used on 8-bit relative branches to encode target address as shown in Table 2 below. |

TABLE 2

Target Address Encoding

| Control Transfer Bit | Displacement Byte Most Significant Bits (binary) | Meaning |
|---|---|---|
| 0 | 00 | Within Current Cache Line |
| 0 | 01 | One Cache Line Above |
| 0 | 10 | Two Cache Lines Above |
| 1 | 01 | One Cache Line Below |
| 1 | 10 | Two Cache Lines Below |

Note: Remaining displacement byte bits are the offset within the target cache line.

Control Transfer Bit is effectively a direction, and the most significant bits of the displacement byte are the number of cache lines.

Predecode unit 12 conveys the received instruction bytes and corresponding predecode information to L1 I-cache 14 for storage. L1 I-cache 14 is a high speed cache memory for storing instruction bytes and predecode information. L1 I-cache 14 may employ any suitable configuration, including direct mapped and set associative configurations. In one particular embodiment, L1 I-cache 14 is a 128 KB, two way set associative cache employing 64 byte cache lines. L1 I-cache 14 includes additional storage for the predecode information corresponding to the instruction bytes stored therein. The additional storage is organized similar to the instruction bytes storage. As used herein, the term "cache line" refers to the unit of allocation of storage in a particular cache. Generally, the bytes within a cache line are manipulated (i.e. allocated and deallocated) by the cache as a unit.

In one embodiment, L1 I-cache 14 is linearly addressed and physically tagged. A cache is linearly addressed if at least one of the address bits used to index the cache is a linear address bit which is subsequently translated to a physical address bit. The tags of a linearly address/ physically tagged cache include each translated bit in addition to the bits not used to index. As specified by the x86 architecture, instructions are defined to generate logical addresses which are translated through a segmentation translation mechanism to a linear address and further translated through a page translation mechanism to a physical address. It is becoming increasingly common to employ flat addressing mode, in which the logical address and corresponding linear address are equal. Processor 10 may be configured to assume flat addressing mode. Accordingly, fetch addresses, target addresses, etc. as generated by executing instructions are linear addresses. In order to determine if a hit is detected in L1 I-cache 14, the linear address presented thereto by fetch/scan unit 18 is translated using a translation lookaside buffer (TLB) to a corresponding physical address which is compared to the physical tags from the indexed cache lines to determine a hit/miss. When flat addressing mode is not used, processor 10 may still execute code but additional clock cycles may be used to generate linear addresses from logical addresses.

L0 I-cache 16 is also a high speed cache memory for storing instruction bytes. Because L1 I-cache 14 is large, the access time of L1 I-cache 14 may be large. In one particular embodiment, L1 I-cache 14 uses a two clock cycle access time. In order to allow for single cycle fetch access, L0 I-cache 16 is employed. L0 I-cache 16 is comparably smaller than L1 I-cache 14, and hence may support a more rapid access time. In one particular embodiment, L0 I-cache 16 is a 512 byte fully associative cache. Similar to L1 I-cache 14, L0 I-cache 16 is configured to store cache lines of instruction bytes and corresponding predecode information (e.g. 512 bytes stores eight 64 byte cache lines and corresponding predecode data is stored in additional storage). In one embodiment, L0 I-cache 16 may be linearly addressed and linearly tagged.

Fetch/scan unit 18 is configured to generate fetch addresses for L0 I-cache 16 and prefetch addresses for L1 I-cache 14. Instructions fetched from L0 I-cache 16 are scanned by fetch/scan unit 18 to identify instructions for dispatch as well as to locate branch instructions and to form branch predictions corresponding to the located branch instructions. Instruction scan information and corresponding instruction bytes are stored into instruction queue 20 by fetch/scan unit 18. Additionally, the identified branch instructions and branch predictions are used to generate subsequent fetch addresses for L0 I-cache 16.

Fetch/scan unit 18 employs a prefetch algorithm to attempt to prefetch cache lines from L1 I-cache 14 to L0 I-cache 16 prior to the prefetched cache lines being fetched by fetch/scan unit 18 for dispatch into processor 10. Any suitable prefetch algorithm may be used. In one embodiment, fetch/scan unit 18 is configured to prefetch the next sequential cache line to a cache line fetched from L0 I-cache 16 during a particular clock cycle unless: (i) a branch misprediction is signalled; (ii) an L0 I-cache miss is detected; or (iii) a target address is generated which is assumed to miss L0 I-cache 16. In one particular embodiment, relative branch instructions employing 32-bit displacements and branch instructions employing indirect target address generation are assumed to miss L0 I-cache 16. For case (i), fetch/scan unit 18 prefetches the cache line sequential to the corrected fetch address. For cases (ii) and (iii), fetch/scan unit 18 prefetches the corresponding miss or target address.

Fetch/scan unit 18 employs an aggressive branch prediction mechanism in attempt to fetch larger "runs" of instructions during a clock cycle. As used herein, a "run" of instructions is a set of one or more instructions predicted to be executed in the sequence specified within the set. For example, fetch/scan unit 18 may fetch runs of 24 instruction bytes from L0 I-cache 16. Each run is divided into several sections which fetch/scan unit 18 scans in parallel to identify branch instructions and to generate instruction scan information for instruction queue 20. According to one embodiment, fetch/scan unit 18 attempts to predict up to two branch instructions per clock cycle in order support large instruction runs.

Instruction queue 20 is configured to store instruction bytes provided by fetch/scan unit 18 for subsequent dispatch. Instruction queue 20 may operate as a first-in, first-out (FIFO) buffer. In one embodiment, instruction queue 20 is configured to store multiple entries, each entry comprising: a run of instructions, scan data identifying up to five instructions within each section of the run, and addresses corresponding to each section of the run. Additionally, instruction queue 20 may be configured to select up to six instructions within up to four consecutive run sections for presentation to alignment unit 22. Instruction queue 20 may, for example, employ 2–3 entries. Additional details regarding one embodiment of instruction queue 20 are discussed in further detail below.

Alignment unit 22 is configured to route instructions identified by instruction queue 20 to a set of issue positions within rename/schedule unit 24. In other words, alignment unit 22 selects the bytes which form each instruction from the run sections provided by instruction queue 20 responsive to the scan information provided by instruction queue 20. The instructions are provided into the issue positions in program order (i.e. the instruction which is first in program order is provided to the first issue position, the second instruction in program order is provided to the second issue position, etc.).

Rename/schedule unit 24 provides register renaming and instruction scheduling functionality. More particularly, rename/schedule unit 24 provides current rename tags for the source registers of each instruction and assigns rename tags to the destination registers of each instruction. The rename tags identify rename registers within rename registers files 30A–30B.

Additionally, rename/schedule unit 24 may attempt to generate lookahead values for certain types of instructions. Lookahead value generation may be particularly beneficial for embodiments employing the x86 instruction set. Because of the nature the x86 instruction set, many of the instructions in a typical code sequence are versions of simple moves. One reason for this feature is that x86 instructions include two operands, both of which are source operands and one of which is a destination operand. Therefore, one of the source operands of each instruction is overwritten with an execution result. Furthermore, the x86 instruction set specifies very few registers for storing register operands. Accordingly, many instructions are moves of operands to and from a stack maintained within memory. Still further, many instruction dependencies are dependencies upon the ESP/EBP registers and yet many of the updates to these registers are increments and decrements of the previously stored values. To accelerate the execution of these instructions, rename/schedule unit 24 attempts to generate lookahead copies of the ESP register for each of instructions decoded during a clock cycle.

The instructions and assigned renames are stored into a scheduler within rename/schedule unit 24. As source operands for the instructions become available (i.e. are written into rename register files 30A–30B), instructions are scheduled for execution by a particular functional unit 32A–32F.

Rename register files 30A–30B receive instructions from rename/schedule unit 24 upon scheduling of those instructions for execution. Rename register files 30A–30B read the rename registers according to the source rename tags of each instruction, and provide the source values to the functional units 32A–32F or address generation units 34A–34D selected for executing each instruction. Rename register files 30A–30B receive execution results from each functional unit (and load memory operation results from D-Cache 38) along with the rename tag assigned to the destination. Rename register files 30A–30B store the execution results in the identified rename registers. Rename register files 30A–30B comprise a plurality of rename registers. For example, each of rename register files 30A–30B may comprise 100–200 rename registers.

Rename register files 30A–30B are maintained as mirror images. Rename register files 30A–30B are provided instead of a single rename register file to reduce the number of read ports provided upon each register file. The number of write ports may remain the same (since results are propagated from one register file to the other). However, the reduction in read ports may provide substantial savings in implementation (e.g., often the number of read ports is approximately twice the number of write ports). Accordingly, rename register file 30A provides operands to functional units 32A–32C and address generation units 34A–34B, and receives results from functional units 32A–32C and D-Cache 38. Similarly, rename register file 30B provides operands to functional units 32D–32F and address generation units 34C–34D and receives results from functional units 32D–32F and D-Cache 38. Results provided to rename register file 30A are propagated to rename register file 30B and results provide to rename register file 30B are propagated to rename register file 30A. In one embodiment, result propagation to the opposite rename register file occurs with a one clock cycle delay.

In embodiments of processor 10 employing the x86 instruction set, an instruction may include implicit memory operations for address generation units 34 and load/store unit 36 as well as explicit functional operations for functional units 32. Instructions having no memory operand do not include any memory operations, and are handled by functional units 32. Instructions having a source memory operand and a register destination operand include an implicit load memory operation handled by address generation units 34 and load/store unit 36 and an explicit functional operation handled by functional units 32. Instructions having a memory source/destination operand include implicit load and store memory operations handled by address generation units 34 and load/store unit 36 and an explicit functional operation handled by functional units 32. Finally, instructions which do not have an explicit functional operation are handled by load/store unit 36. Each memory operation results in an address generation handled by address generation units 34. Memory operations and instructions (i.e. functional operations) may be referred to herein separately, but may be sourced from a single instruction.

Address generation units 34 are configured to perform address generation operations, thereby generating addresses for memory operations. The generated addresses are forwarded to L1 D-Cache 38 and to load/store unit 36. According to one embodiment, address generation units 34A and 34C are used for load memory operations and address generation units 34B and 34D are used for store memory operations. Functional units 32A and 32D are integer functional units configured to perform integer arithmetic/logical operations and execute branch instructions. Functional units 32B and 32E are multimedia execution units configured to execute multimedia instructions, and functional units 32C and 32F are floating point units configured to execute floating point instructions. In the embodiment shown, each functional unit 32 is configured to execute up to two instructions per clock cycle of the appropriate type. Certain restrictions may apply (e.g. only one integer multiply per clock cycle, one floating point transcendental, etc.)

Load/store unit 36 is configured to interface with L1 D-cache 38 to perform the data storage portion of store memory operations and to handle load/store dependency checking. A memory operation is a transfer of data between processor 10 and an external memory. The memory operation may be an explicit instruction, or may be implicit portion of an instruction which also includes operations to be executed by functional units 32. Load memory operations specify a transfer of data from external memory to processor 10, and store memory operations specify a transfer of data from processor 10 to external memory. If a hit is detected for a memory operation within L1 D-cache 38, the memory operation is completed therein without access to external memory.

L1 D-cache 38 is a high speed cache memory for storing data. Any suitable configuration may be used for L1 D-cache 38, including set associative and direct mapped configurations. In one particular embodiment, L1 D-cache 38 is a 128 KB two way set associative cache employing 64 byte lines. L1 D-cache 38 may be organized as, for example, 32 banks of cache memory per way. Additionally, L1 D-cache 38 may be a linearly addressed/physically tagged cache employing a TLB similar to L1 I-cache 14.

External interface unit 42 is configured to transfer cache lines of instruction bytes and data bytes into processor 10 in response to cache misses. Instruction cache lines are routed to predecode unit 12, and data cache lines are routed to L1 D-cache 38. Additionally, external interface unit 42 is configured to transfer cache lines discarded by L1 D-cache 38 to memory if the discarded cache lines have been modified to processor 10. As shown in FIG. 1, external interface unit 42 is configured to interface to an external L2 cache via L2 interface 44 as well as to interface to a computer system via bus interface 46. In one embodiment, bus interface unit 46 comprises an EV/6 bus interface.

Figure 2:
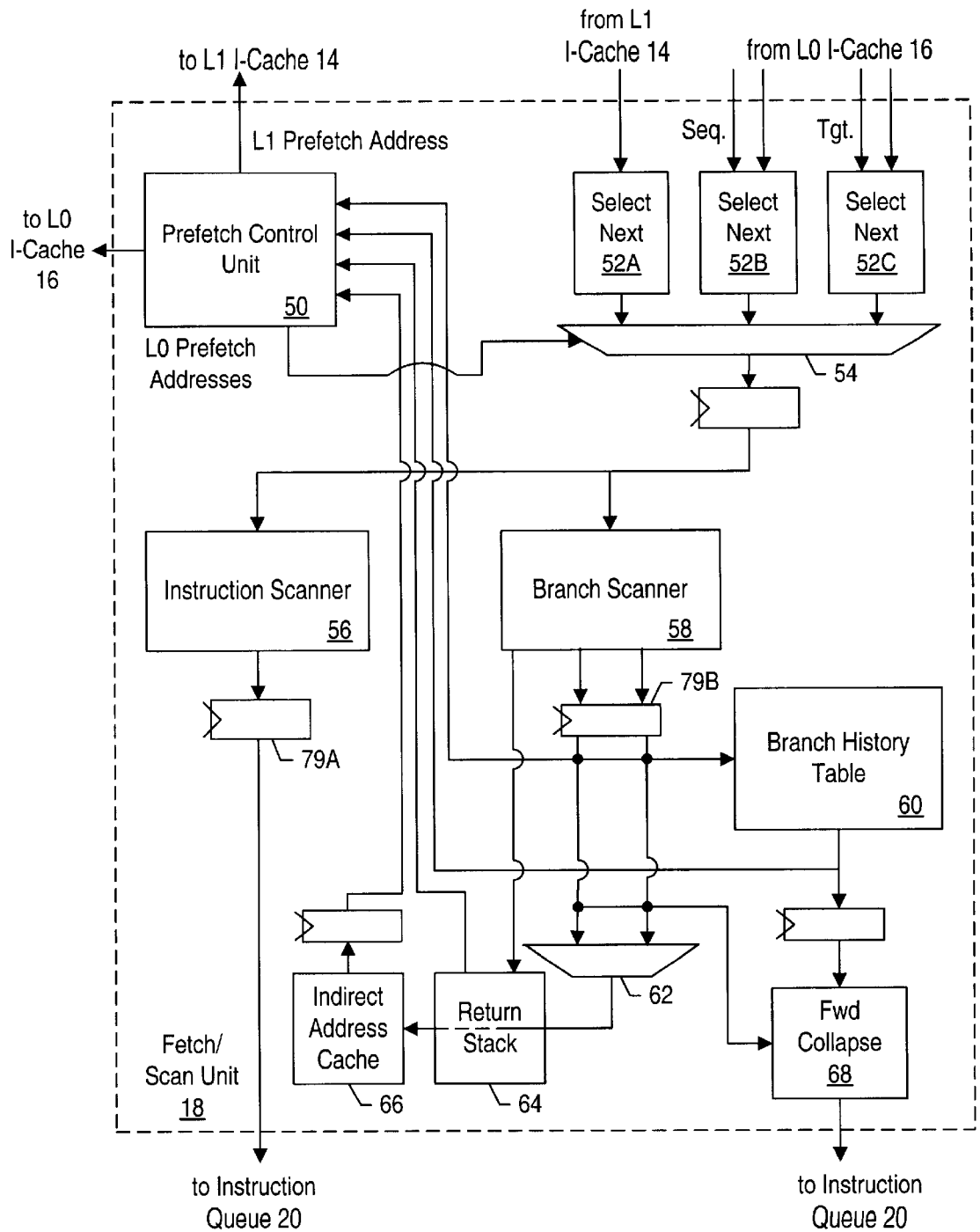
FIG. 2 is a block of one embodiment of a fetch/scan unit shown in FIG. 1.

Turning now to FIG. 2, a block diagram of one embodiment of fetch/scan unit 18 is shown. Other embodiments are possible and contemplated. As shown in FIG. 2, fetch/scan unit 18 includes a prefetch control unit 50, a plurality of select next blocks 52A–52C, an instruction select multiplexor (mux) 54, an instruction scanner 56, a branch scanner 58, a branch history table 60, a branch select mux 62, a return stack 64, an indirect address cache 66, and a forward collapse unit 68. Prefetch control unit 50 is coupled to L1 I-cache 14, L0 I-cache 16, indirect address cache 66, return stack 64, branch history table 60, branch scanner 58, and instruction select mux 54. Select next block 52A is coupled to L1 I-cache 14, while select next blocks 52B–52C are coupled to L0 I-cache 16. Each select next block 52 is coupled to instruction select mux 54, which is further coupled to branch scanner 58 and instruction scanner 56. Instruction scanner 56 is coupled to instruction queue 20. Branch scanner 58 is coupled to branch history table 60, return stack 64, and branch select mux 62. Branch select mux 62 is coupled to indirect address cache 66. Branch history table 60 and branch scanner 58 are coupled to forward collapse unit 68, which is coupled to instruction queue 20.

Prefetch control unit 50 receives branch prediction information (including target addresses and taken/not taken predictions) from branch scanner 58, branch history table 60, return stack 64, and indirect address cache 66. Responsive to the branch prediction information, prefetch control unit 50 generates fetch addresses for L0 I-cache 16 and a prefetch address for L1 I-cache 14. In one embodiment, prefetch control unit 50 generates two fetch addresses for L0 I-cache 16. The first fetch address is selected as the target address corresponding to the first branch instruction identified by branch scanner 58 (if any). The second fetch address is the sequential address to the fetch address selected in the previous clock cycle (i.e. the fetch address corresponding to the run selected by instruction select mux 54).

L0 I-cache 14 provides the cache lines (and predecode information) corresponding to the two fetch addresses, as well as the cache lines (and predecode information) which are sequential to each of those cache lines, to select next blocks 52B–52C. More particularly, select next block 52B receives the sequential cache line corresponding to the sequential address and the next incremental cache line to the sequential cache line. Select next block 52C receives the target cache line corresponding to the target address as well as the cache line sequential to the target cache line. Additionally, select next blocks 52B–52C receive the offset portion of the corresponding fetch address. Select next blocks 52B–52C each select a run of instruction bytes (and corresponding predecode information) from the received cache lines, beginning with the run section including the offset portion of the corresponding fetch address. Since the offset portion of each fetch address can begin anywhere within the cache line, the selected run may included portions of the fetched cache line and the sequential cache line to the fetched cache line. Hence, both the fetched cache line and the sequential cache line are received by select next blocks 52B–52C.

Similarly, select next block 52A receives a prefetched cache line (and corresponding predecode information) from L1 I-cache 14 and selects an instruction run therefrom. Since one cache line is prefetched from L1 I-cache 14, the run selected therefrom may comprise less than a fill run if the offset portion of the prefetch address is near the end of the cache line. It is noted that the fetch cache lines from L0 I-cache 16 may be provided in the same clock cycle as the corresponding addresses are generated by prefetch control unit 50, but the prefetch cache line may be a clock cycle delayed due to the larger size and slower access time of L1-cache 14. In addition to providing the prefetched cache line to select next block 52A, L1 I-cache 14 provides the prefetched cache line to L0 I-cache 16. If the prefetched cache line is already stored within L0 I-cache 16, L0 I-cache 16 may discard the prefetched cache line. However, if the prefetched cache line is not already stored in L0 I-cache 14, the prefetched cache line is stored into L0 I-cache 16. In this manner, cache lines which may be accessed presently are brought into L0 I-cache 16 for rapid access therefrom. It is noted that, in one particular embodiment, L0 I-Cache 16 is organized as a fully associative cache. Other organizations may be used as desired (e.g. direct mapped, set associative, etc.).

Prefetch control unit 50 selects the instruction run provided by one of select next blocks 52 in response to branch prediction information by controlling instruction select mux 54. As will be explained in more detail below, prefetch control unit 50 receives target addresses from branch scanner 58, return stack 64, and indirect address cache 66 early in the clock cycle as well as at least a portion of the opcode byte of the first branch instruction identified by branch scanner 58. Prefetch control unit 50 decodes the portion of the opcode byte to select the target address to be fetched from L0 I-cache 16 from the various target address sources and provides the selected target address to L0 I-cache 16. In parallel, the sequential address to the fetch address selected in the previous clock cycle (either the target address or the sequential address from the previous clock cycle, depending upon the branch prediction from the previous clock cycle) is calculated and provided to L0 I-cache 16. Branch prediction information (i.e. taken or not taken) is provided by branch history table 60 late in the clock cycle. If the branch instruction corresponding to the target address fetched from L0 I-cache 16 is predicted taken, then prefetch control unit 50 selects the instruction run provided by select next block 52C. On the other hand, if the branch instruction is predicted not taken, then the instruction run selected by select next block 52B is selected. The instruction run provided by select next block 52A is selected if a predicted fetch address missed L0 I-cache 16 in a previous clock cycle and was fetched from L1 I-cache 14. Additionally, the instruction run from L1 I-cache 14 is selected if the instruction run was prefetched responsive to a branch instruction have a 32 bit displacement or indirect target address generation or an L0 I-cache miss was fetched.

The selected instruction run is provided to instruction scanner 56 and branch scanner 58. Instruction scanner 56 scans the predecode information corresponding to the selected instruction run to identify instructions within the instruction run. More particularly in one embodiment, instruction scanner 56 scans the start bits corresponding to each run section in parallel and identifies up to five instructions within each run section. Pointers to the identified instructions (offsets within the run section) are generated. The pointers, instruction bytes, and addresses (one per run section) are conveyed by instruction scanner 56 to instruction queue 20. If a particular run section includes more than five instructions, the information corresponding to run sections subsequent to the particular run section is invalidated and the particular run section and subsequent run sections are rescanned during the next clock cycle.

For embodiments employing microcode, microcode instructions are identified during decode of the instructions (e.g. via the absence of a directly decoded instruction in an issue position to which an instruction was issued).

Branch scanner 58 scans the instruction run in parallel with instruction scanner 56. Branch scanner 58 scans the start bits and control transfer bits of the instruction run to identify the first two branch instructions within the instruction run. As described above, a branch instruction is identified by the control transfer bit corresponding to the start byte of an instruction (as identified by the start bit) being set. Upon locating the first two branch instructions, branch scanner 58 assumes that the instructions are relative branch instructions and selects the corresponding encoded target addresses from the instruction bytes following the start byte of the branch instruction. For embodiments employing the x86 instruction set, a nine bit target address (the displacement byte as well as the corresponding control transfer bit) is selected, and a 32 bit target address is selected as well. Furthermore, at least a portion of the opcode byte identified by the start and control transfer bits is selected. The target addresses and opcode bytes are routed to prefetch control unit 50 for use in selecting a target address for fetching from L0 I-cache 16. The fetch addresses of each branch instruction (determined from the fetch address of the run section including each branch instruction and the position of the branch instruction within the section) are routed to branch history table 60 for selecting a taken/not-taken prediction corresponding to each branch instruction. Furthermore, the fetch addresses corresponding to each branch instruction are routed to branch select mux 62, which is further routed to indirect address cache 66. The target address of each branch instruction is routed to forward collapse unit 68. According to one embodiment, branch scanner 58 is configured to scan each run section in parallel for the first two branch instructions and then to combine the scan results to select the first two branch instructions within the run.

Branch scanner 58 may further be configured to determine if a subroutine call instruction is scanned during a clock cycle. Branch scanner 58 may forward the fetch address of the instruction following the detected subroutine call instruction to return stack 64 for storage therein.

In one embodiment, if there are more than two branch instructions within a run, the run is scanned again during a subsequent clock cycle to identify the subsequent branch instruction.

The fetch addresses of the identified branch instructions are provided to branch history table 60 to determine a taken/not taken prediction for each instruction. Branch history table 60 comprises a plurality of taken/not-taken predictors corresponding to the previously detected behavior of branch instructions. One of the predictors is selected by maintaining a history of the most recent predictions and exclusive ORing those most recent predictions with a portion of the fetch addresses corresponding to the branch instructions. The least recent (oldest) prediction is exclusive ORed with the most significant bit within the portion of the fetch address, and so forth through the most recent prediction being exclusive ORed with the least significant bit within the portion of the fetch address. Since two predictors are selected per clock cycle, the predictor corresponding to the second branch instruction is dependent upon the prediction of the first branch instruction (for exclusive ORing with the least significant bit of the corresponding fetch address). Branch history table 60 provides the second predictor by selecting both of the predictors which might be selected (i.e. the predictor that would be selected if the first branch instruction is predicted not-taken and the predictor that would be selected if the first branch instruction is predicted taken) and then selecting one of the two predictors based on the actual prediction selected for the first branch instruction.

Branch history table 60 receives information regarding the execution of branch instructions from functional units 32A–32D. The history of recent predictions corresponding to the executed branch instruction as well as the fetch address of the executed branch instruction are provided for selecting a predictor to update, as well as the taken/not taken result of the executed branch instruction. Branch history table 60 selects the corresponding predictor and updates the predictor based on the taken/not taken result. In one embodiment, the branch history table stores a bimodal counter. The bimodal counter is a saturating counter which saturates at a minimum and maximum value (i.e. subsequent decrements of the minimum value and increments of the maximum value cause no change in the counter). Each time a branch instruction is taken, the corresponding counter is incremented and each time a branch instruction is not taken, the corresponding counter is decremented. The most significant bit of the counter indicates the taken/not taken prediction (e.g. taken if set, not taken if clear). In one embodiment, branch history table 60 stores 64K predictors and maintains a history of the 16 most recent predictions. Each clock cycle, the predictions selected during the clock cycle are shifted into the history and the oldest predictions are shifted out of the history.

Return stack 64 is used to store the return addresses corresponding to detected subroutine call instructions. Return stack 64 receives the fetch address of a subroutine call instruction from branch scanner 58. The address of the byte following the call instruction (calculated from the fetch address provided to return stack 64) is placed at the top of return stack 64. Return stack 64 provides the address stored at the top of the return stack to prefetch control unit 50 for selection as a target address if a return instruction is detected by branch scanner 58 and prefetch control unit 50. In this manner, each return instruction receives as a target address the address corresponding to the most recently detected call instruction. Generally in the x86 instruction set, a call instruction is a control transfer instruction which specifies that the sequential address to the call instruction be placed on the stack defined by the x86 architecture. A return instruction is an instruction which selects the target address from the top of the stack. Generally, call and return instructions are used to enter and exit subroutines within a code sequence (respectively). By placing addresses corresponding to call instructions in return stack 64 and using the address at the top of return stack 64 as the target address of return instructions, the target address of the return instruction may be correctly predicted. In one embodiment, return stack 64 may comprise 16 entries.

Indirect address cache 66 stores target addresses corresponding to previous executions of indirect branch instructions. The fetch address corresponding to an indirect branch instruction and the target address corresponding to execution of the indirect branch instruction are provided by functional units 32A–32D to indirect address cache 66. Indirect address cache 66 stores the target addresses indexed by the corresponding fetch addresses. Indirect address cache 66 receives the fetch address selected by branch select mux 62 (responsive to detection of an indirect branch instruction) and, if the fetch address is a hit in indirect address cache 66, provides the corresponding target address to prefetch control unit 50. In one embodiment, indirect address cache 66 may comprise 32 entries. According to one particular embodiment, if the fetch address is a hit in indirect address cache 66, no target address is provided from indirect address cache 66. Alternatively, one of the target addresses stored therein may be selected as a "guessed" target address, if desired.

According to one embodiment, prefetch control unit 50 selects the target address for fetching from L0 I-cache 16 from: (i) the first encoded target address corresponding to the first branch instruction identified by branch scanner 58; (ii) the return stack address provided by return stack 64; and (iii) a sequential address. Prefetch control unit 50 selects the first encoded target address if a decode of the opcode corresponding to the first instruction indicates that the instruction may be a relative branch instruction. If the decode indicates that the instruction may be a return instruction, then the return stack address is selected. Otherwise, the sequential address is selected. Indirect target addresses and 32 bit relative target addresses are prefetched from L1 I-cache 14. Since these types of target addresses are often used when the target address is not near the branch instruction within memory, these types of target addresses are less likely to hit in L0 I-cache 16. Additionally, if the second branch instruction is predicted taken and the first branch instruction is predicted not taken or the first branch instruction is a forward branch which does not eliminate the second branch instruction in the instruction run, the second target address corresponding to the second branch prediction may be used as the target fetch address during the succeeding clock cycle according to one embodiment.

It is noted that, if an encoded target address is selected, the actual target address may be presented to L0 I-cache 16. Prefetch control unit 50 may be configured to precalculate each of the possible above/below target addresses and select the correct address based on the encoded target address. Alternatively, prefetch control unit 50 may record which L0 I-cache storage locations are storing the above and below cache lines, and select the storage locations directly without a tag compare.

Forward collapse unit 68 receives the target addresses and positions within the instruction run of each selected branch instruction as well as the taken/not taken predictions. Forward collapse unit 68 determines which instructions within the run should be cancelled based upon the received predictions. If the first branch instruction is predicted taken and is backward (i.e. the displacement is negative), all instructions subsequent to the first branch instruction are cancelled. If the first branch instruction is predicted taken and is forward but the displacement is small (e.g. within the instruction run), the instructions which are between the first branch instruction and the target address are cancelled. The second branch instruction, if still within the run according to the first branch instruction's prediction, is treated similarly. Cancel indications for the instructions within the run are set to instruction queue 20.

Prefetch control unit 50 may be further configured to select a cache line within L0 I-cache 16 for replacement by a cache line provided from L1 I-cache 14. In one embodiment, prefetch control unit 50 may use a least recently used (LRU) replacement algorithm.

Figure 3:
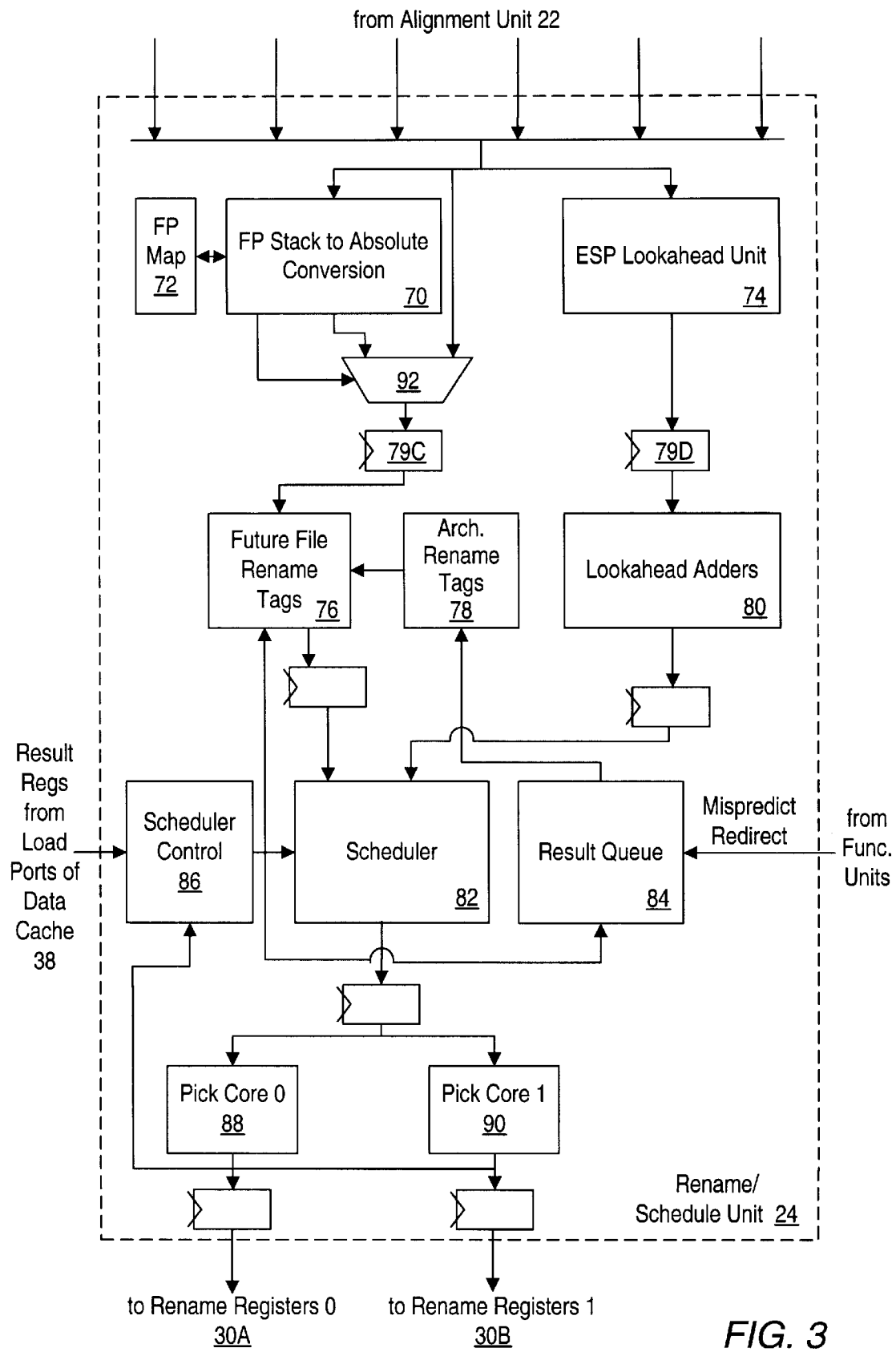
FIG. 3 is a block diagram of one embodiment of a rename/schedule unit shown in FIG. 2.

Turning next to FIG. 3, a block diagram of one embodiment of rename/schedule unit 24 is shown. Other embodiments are possible and contemplated. In the embodiment of FIG. 3, rename/schedule unit 24 includes an FP stack to absolute conversion unit 70, an FP map 72, an ESP lookahead unit 74, a future file rename tags unit 76, an architectural rename tags unit 78, a lookahead adders 80, a scheduler 82, a result queue 84, a scheduler control unit 86, a first pick core unit 88, and a second pick core unit 90. FP stack to absolute conversion unit 70 and ESP lookahead unit 74 are coupled to alignment unit 22. FP stack to absolute conversion unit 70 is coupled to FP Map 72 and to a multiplexor 92, which is further coupled to alignment unit 22 and to future file rename tags unit 76. ESP lookahead unit 74 is coupled to lookahead adders 80, which is further coupled to scheduler 82. Lookahead adders 80 and future file rename tags unit 76 are coupled to scheduler 82. Future file rename tags unit 76 is further coupled to scheduler control unit 86 and to architectural rename tags unit 78. Architectural rename tags unit 78 is coupled to result queue 84, which is further coupled to schedule control unit 86. First and second pick core units 88 and 90 are coupled to scheduler 82 and to first and second rename register files 30A and 30B, respectively. It is noted that one or more decode units (not shown) may be coupled in parallel with FP stack to absolute conversion unit 70 and ESP lookahead unit 74, or serially before are after these units, to perform instruction decode operations.

As described above, alignment unit 22 aligns instructions to a set of issue positions within rename/schedule unit 24. The issue positions are maintained within scheduler 82 and result queue 84. Prior to storing the instructions into scheduler 82 and result queue 84, the instructions are presented to FP stack to absolute conversion unit 70 and ESP lookahead unit 74.

FP stack to absolute conversion unit 70 is provided for embodiments of processor 10 in which the floating point registers are operated as a stack (e.g. the x86 floating point architecture). One of the floating point registers is identified by a top of stack pointer in the floating point status register as the top of the stack, and other floating point registers are at positions within the stack according to their relative distance from the register identified by the top of stack. Some floating point instructions, in addition to or instead of specifying an operation upon one or more entries within the stack, may specify pushing a value onto or popping a value off of the stack. FP stack to absolute conversion unit 70 converts the stack relative register specifiers included in the floating point instructions to absolute register specifiers (i.e. register numbers which would address a floating point register file). FP stack to absolute conversion unit 70 maintains a speculative top of stack pointer corresponding to previously dispatched floating point instructions in order to perform the conversion. Additionally, FP stack to absolute conversion unit 70 determines the effect of each floating point instruction upon the top of stack pointer in order to convert the register specifiers for the next floating point instruction.

The x86 floating point architecture also specifies an exchange instruction which exchanges the values within two registers. FP stack to absolute conversion unit 70 may accelerate the exchange instruction (and instructions that follow), by swapping the absolute register specifiers corresponding to the two instructions instead of actually exchanging the values within the registers. FP map 72 is provided for this purpose. FP map 72 initially records the absolute register numbers in order from zero to N−1 (e.g. 0 to 7 in the x86 architecture). As exchange instructions are performed, the absolute register specifiers affected by the instructions are swapped within FP map 72. The absolute register number for a given floating point instruction may be determined by reading an entry in floating point map 72 as selected by the current speculative top of stack pointer and the position within the stack of the specified register (e.g. what would have been the absolute register specifier in the absence of exchange instructions).

The output of FP stack to absolute conversion unit 70 is provided to one input of multiplexor (mux) 92. The original register specifiers are provided to the other input of multiplexor 92. For each instruction, FP stack to absolute conversion unit 70 selects either its output or the original instruction, based upon whether or not that instruction is floating point. It is noted that, because exchange instructions may change the order of absolute register numbers, multimedia instructions have their register numbers (which are absolute) converted by FP stack to absolute conversion unit 70 as well in embodiments employing the x86 microprocessor architecture. It is further noted that the opcode and other instruction information (e.g. immediate fields and displacement fields) are passed unmodified through mux 82 and future file and rename tags unit 76 to be stored into scheduler 82.

ESP lookahead unit 74 is used, in combination with lookahead adders 80, to generate speculative values for the ESP register for each instruction which has the ESP as a source operand (for embodiments of processor 10 employing the x86 architecture). Because the x86 architecture specifies relatively few registers, many of which are not general purpose, many x86 instructions manipulate stack operands. The stack operands may be located using the ESP register as an address operand. Additionally, many instructions may modify the ESP register (e.g. pushing and popping values). Pushing and popping values results in an increment or decrement of the ESP register. Accordingly, many modifications to the ESP register may be generated ahead of time as a constant value to be added or subtracted from the ESP register.

ESP lookahead unit 74 scans the instructions provided within the set of issue positions to generate the constants that are added to the ESP register value existing prior to execution of the first instruction within the set of issue positions provided to ESP lookahead unit 74. These constants may be added to the speculative lookahead value of the ESP register (corresponding to the instructions previously dispatched by processor 10) to generate the ESP value for each instruction. In other words, the constant generated for the first issue position (in program order), includes the effects of the instruction in the first issue position (if the instruction modifies the ESP prior to using it as an address operand, e.g. a push). The constant generated for the second issue position includes the effects of the instruction in the first issue position and the effects of the instruction in the second issue position (if the instruction modifies the ESP prior to using it as an address operand, e.g. a push). Generally, the constant generated for issue position N includes the effects on the ESP of the instructions in the first issue position through issue position N−1, and the effects of the instruction in issue position N (if the instruction modifies the ESP prior to using it as an address operand, e.g. a push).

Additionally, ESP lookahead unit 74 may maintain a cumulative offset indicating the cumulative effect on the ESP value of instructions beginning with the most recent non-accelerated ESP operation. The constants generated by ESP lookahead unit 74 may be added to the cumulative offset to generate a set of output constants from ESP lookahead unit 74.

The output constants generated by ESP lookahead unit 74 are provided to lookahead adders 80. Lookahead adders 80 add the constants received from ESP lookahead unit 74 to the ESP value corresponding to the most recent non-accelerated ESP value to generate lookahead ESP values for each instruction. If ESP lookahead unit 74 detects such a non-accelerated operation, ESP lookahead unit 74 may stall the instructions subsequent to the instruction performing the non-accelerated operation until that instruction executes. The update may be received by ESP adders 80 to allow for subsequent generation of speculative lookahead ESP values. According to one embodiment, the following x86 instructions are accelerated updates: CALL; RET 0,N; PUSH; POP; ADD ESP, IMM; ENTER 0, N; LEAVE 0, N; MOV EBP, ESP; and MOV ESP, EBP. Other embodiments may provide additional, fewer, or substitute operations as accelerated operations.

The register specifiers as selected by mux 92 are passed to future file rename tags unit 76 for renaming. Future file rename tags unit 76 provides the current rename tag to each source register, and assigns a new rename register from a list of free rename registers to each destination register. Future file rename tags unit 76 also resolves the dependencies between concurrently dispatched instructions. Finally, future file rename tags unit 76 updates its future file of rename tags to represent the newly assigned rename registers.

The instructions, including rename register tags and lookahead ESP values from lookahead adders 80, are provided to scheduler 82 for storage. In one embodiment, scheduler 82 is "line-oriented" in which a line of storage capable of storing instructions and associated information from each issue position is allocated, even if instructions do not fill each issue position. Additionally, storage is allocated in result queue 84 for storing the destination register rename tags.

Once the instructions are stored into scheduler 82, the instructions await validity of their source operands, at which time the instructions are eligible to be selected for execution ("scheduled"). Future file rename tags unit 76 maintains a validity indication for each rename register which is a current rename register (i.e. a register currently assigned to a particular architected register), so that instructions which have source operands which are already valid will indicate validity of those source operands upon storage into scheduler 82. Rename registers which are invalid indicate that the source operand is not yet valid (i.e. has not been updated in response to executing the instruction which updates the rename register) and therefore the instruction is not yet eligible for scheduling.

First and second pick core units 88 and 90 examine the instructions within scheduler 82 which are eligible for scheduling and schedule instructions to the corresponding first and second cores, respectively. The first core comprises the functional units and address generation units attached to rename register file 30A, and similarly the second core comprises the functional units and address generation units attached to rename register file 30B. The instructions selected by first and second pick core units 88 and 90 are provided to rename register files 30A and 30B for operand read, and are also provide to scheduler control unit 86.

Scheduler control unit 86 records the destination rename register for each scheduled instruction, and determines when the rename register is valid. Upon determining that the rename register is valid, the rename tag corresponding to the rename register is broadcast to the scheduler. Each source register rename tag which matches the broadcast tag is marked valid. For integer, floating point, and multimedia functional units according to the present embodiment, the number of clock cycles until the rename register is valid is a constant determined by the type of instruction and the instruction (e.g. multiplies may involve more clock cycles than adds, etc.). Memory operations, because they may involve cache misses and hence variable delays from scheduling to rename validity, are indicated as valid or not valid by data cache 38 to scheduler control unit 86. Scheduler control unit 86 may withhold validation of rename tags corresponding to memory operations until indicated valid by data cache 38.

Scheduler control unit 86 also broadcasts the validated register rename tags to future file rename tags unit 76 (so that future file rename tags unit 76 may indicate the rename tags as valid if they are still the current register renames within the future file) and to result queue 84 (so that result queue 84 may indicate that the corresponding instruction has been executed successfully).

Result queue 84 is provided to handle branch misprediction and other exception handling and in-order retirement of instructions. An instruction is retired by storing the rename tags identifying the rename registers assigned to the destination of the instruction into architectural rename tags unit 78. Result queue 84 may store the rename tag assigned to the destination register of the instruction, as well as the architected destination register number. In this manner, the rename tag may be associated with the corresponding architected register within architectural rename tags unit 78. The previous rename tag corresponding to that architected register may then be returned to the free list. Additionally, result queue 84 received misprediction redirection/exception information from the functional units to determine which instructions experienced an exception. Upon retiring an instruction which was mispredicted are experienced another type of exception, result queue 84 signals architectural rename tags 78 to copy its contents to future file rename tags unit 76. The future file of rename tags may thereby be recovered from the exception. It is noted that, if instructions are fetched from the corrected path and arrive at future file rename tags unit 76 prior to restoring the future file renames to the architectural renames, the instructions may be stalled until the exception causing instruction and prior instructions are retired and the future file tags are recovered. It is further noted that, upon retiring a move instruction for which the tags were swapped, the architected tags of the two registers involved in the move instruction may be swapped as well.

According to one embodiment, a line of instructions may be deallocated from scheduler 82 upon successful scheduling of all instructions within the line or invalidation of the line due to misprediction or exception. The line of instructions may be deallocated from result queue 84 upon selection for retirement or upon invalidation due to misprediction or exception.

It is noted that various storage devices are shown in FIGS. 2 and 3 (e.g. devices 79A, 79B, and similar devices in FIG. 2 and devices 79C, 79D and similar devices in FIG. 3). The storage devices represent latches, registers, flip-flops and the like which may be used to separate pipeline stages. However, the particular pipeline stages shown in FIGS. 2 and 3 are but one embodiment of suitable pipeline stages for one embodiment of processor 10. Other pipeline stages may be employed in other embodiments.

Figure 4:
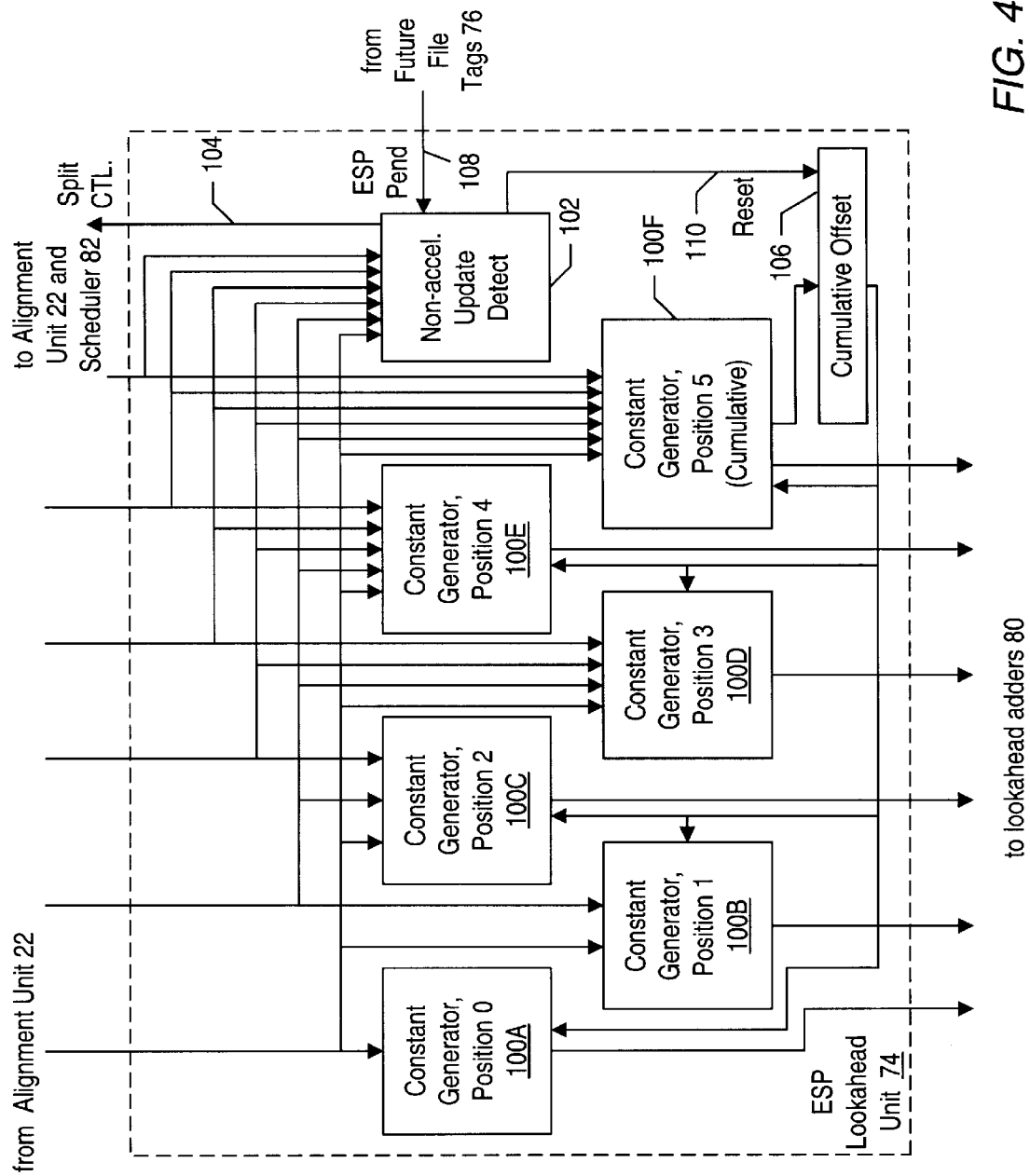
FIG. 4 is a block diagram of one embodiment of an ESP lookahead unit shown in FIG. 3.

Turning next to FIG. 4, a block diagram of one embodiment of ESP lookahead unit 74 is shown. Other embodiments are possible and contemplated. In the embodiment of FIG. 4, ESP lookahead unit 74 includes a plurality of constant generators 100A–100F, a non-accelerated update detect unit 102, and a cumulative offset register 106. Constant generators 100 are coupled to receive instructions from alignment unit 22, and to provide constants to lookahead adders 80. Constant generators 100 are further coupled to cumulative offset register 106. Additionally, non-accelerated update detect unit 102 is coupled to receive instructions from alignment unit 22. Non-accelerated detect unit 102 provides split control information via split control bus 104. Still further, non-accelerated update detect unit 102 is coupled to receive an ESP pending signal upon ESP pending line 108. Non-accelerated update detect unit 102 provides a reset signal upon a reset line 110 to cumulative offset register 106.

Each constant generator 100A–100F corresponds to one of the issue positions to which instructions are aligned by alignment unit 22, and generates a constant indicating the cumulative update to the ESP of the instructions between the instruction within that issue position and the most recent non-accelerated operation to the ESP. Accordingly, each constant generator 100A–100F scans the instructions within the line which are in issue positions prior to or including that issue position. For example, constant generator 100A (which generates the constant for issue position 0) scans the instruction within issue position 0. Constant generator 100B scans the instructions within issue positions 0 and 1, etc. In addition to the updates to the ESP within the line, each constant generator 100 receives the cumulative offset stored in cumulative offset register 106 and includes the cumulative offset in the constant generation. The cumulative offset represents the cumulative effect of the instructions dispatched prior to the current line of instructions and subsequent to the most recent non-accelerated operation to the ESP. Accordingly, the constants generated by constant generators 100 are offsets to the value produced upon execution of the most recent non-accelerated operation to the ESP. Lookahead adders 80 may capture the result of the non-accelerated operation to the ESP, and add the constants provided by constant generators 100 to the result to generate ESP values corresponding to each instruction. Dependencies upon the ESP may thereby be alleviated.

Constant generator 100F generates two constants. The first constant corresponds to the instruction within issue position 5, while the second constant is the cumulative offset to be stored into cumulative offset register 106. The second constant is generated by adding the current cumulative constant (stored in cumulative offset register 106) to the sum total of the modifications to the ESP by the line of instructions being scanned in constant generators 100. The first and second constants generated by constant generator 100F may differ in the case in which the instruction within issue position 5 uses the value of the ESP as a source, and then increments or decrements the value to store into the ESP register as a destination (e.g. POP). Alternatively, the cumulative constant may be generated separately (e.g. by non-accelerated update detect unit 102).

By updating the cumulative offset stored in cumulative offset register 106 using the current cumulative offset and the instructions being dispatched, cumulative offset register 106 may represent the cumulative effect of a set of instructions dispatched over multiple clock cycles. As a line of instructions are dispatched, the effect of the instructions within the line are recorded in the cumulative offset as a modification to the cumulative offset representing the previously dispatched instructions. In other words, the cumulative offset may be viewed as a running sum of the modifications to the ESP value over one or more cycles of instruction dispatch. As used herein, the term "dispatch" refers to the selection of instructions from a storage stage (e.g. instruction caches 14–16, instruction queue 20, or scheduler 82 in the present embodiment) for transmission through one or more stages of processing within the pipeline.

Non-accelerated update detect unit 102 scans the instructions provided by alignment unit 22 to detect operations to the ESP which are not accelerated by constant generators 100. In one particular embodiment mentioned above, operations to the ESP according to the following instructions are accelerated: CALL; RET 0,N; PUSH; POP; ADD ESP, IMM; ENTER 0, N; LEAVE 0, N; MOV EBP, ESP; and MOV ESP, EBP. Other operations to the ESP are detected by non-accelerated update detect unit 102. Upon detecting such a non-accelerated operation, non-accelerated update detect unit 102 splits the set of instructions provided by alignment unit 22 (the "line") at the instruction performing the non-accelerated operation. Instructions prior to and including the instruction having the non-accelerated operation are dispatched to lookahead adders 80 and future file rename tags unit 76, while the remaining instructions are stalled until the non-accelerated operation completes. When splitting a line, non-accelerated update detect unit 102 informs alignment unit 22, scheduler 82, and future file rename tags unit 76 via split control bus 104. The instruction at which the split is generated is provided, along with an asserted control signal indicating that the split is occurring. It is noted that, while an exemplary set of accelerated operations is provided above, other sets of accelerated operations are contemplated, including sets which are subsets or supersets of the above set.

Upon splitting a line at a non-accelerated operation, non-accelerated update detect unit 102 determines, from the state of the ESP pending line subsequent to the split, whether or not the new value of the ESP (corresponding to the non-accelerated operation) is valid in rename register files 30. If the ESP is still pending (i.e. not valid), then non-accelerated update detect unit 102 stalls subsequent instruction dispatch until the ESP becomes valid. Once the ESP becomes valid, lookahead adders 80 may read the new value of the ESP for use with constants generated by constant generators 100.

In addition to splitting the line of instructions at an instruction including a non-accelerated operation for the ESP, non-accelerated update detect unit 102 may be configured to assert a reset signal upon reset line 110. Since a more recent non-accelerated operation has been detected, the cumulative offset is reset to begin accumulating modifications to the newly detected non-accelerated update. In response to the reset line, cumulative offset register 106 resets to a zero value.

While the present embodiment illustrates ESP lookahead unit 74 generating cumulative constants for use by lookahead adders 80, ESP lookahead unit 74 may be implemented without lookahead adders 80. Instead, ESP lookahead unit 74 may be employed to generate constants, and the constants may be used in functional units and address generation units (e.g. units 32 and 34 shown in FIG. 1). While the functional units/address generation units actually generate the ESP values during execution in such an embodiment, dependencies upon the ESP may still be alleviated via the cumulative constants (i.e. instructions are dependent upon the most recent non-accelerated operation, even if instructions having accelerated updates to the ESP intervene). Furthermore, while the present embodiment employs multiple constant generators to generate constants for multiple concurrently dispatched instructions, other embodiments may employ a single constant generator. Such an embodiment may be suitable, for example, for a scalar implementation. A cumulative offset may still be maintained as described above, while one constant is generated per clock cycle.

It is noted that moves from the ESP to the EBP (and vice versa) may be detected and handled by swapping the rename tags in future file rename tags 76.

Figure 5:
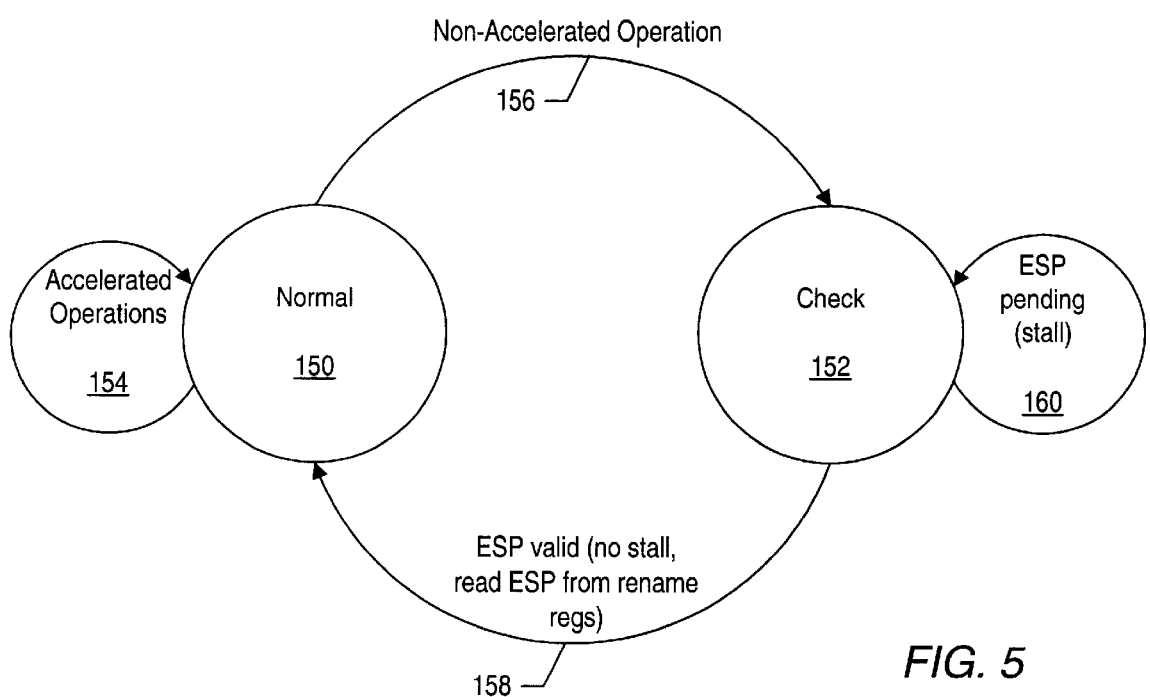
FIG. 5 is a state machine which may be employed by one embodiment of a non-accelerated update detect unit shown in FIG. 4.

Turning now to FIG. 5, an exemplary state machine which may be employed by one embodiment of non-accelerated update detect unit 102 is shown. Other embodiments are possible and contemplated. For example, other embodiments may employ different state machines, or none at all, depending upon the pipeline of the processor into which they are included. In the embodiment of FIG. 5, a normal state 150 and a check state 152 are provided.

Prior to detecting split line conditions, non-accelerated update detect unit 102 is in normal state 150. In normal state 150, non-accelerated update detect unit 102 detects accelerated operations to ESP and allows cumulative constant generation and cumulative offset maintenance by constant generators 100 and cumulative offset register 106 to continue. If accelerated operations are detected, non-accelerated update detect unit 102 remains in state 150 (arc 154). On the other hand, if a non-accelerated operation to the ESP is detected, non-accelerated update detect unit 102 transitions to state 152 (arc 156). Additionally, non-accelerated update detect unit 102 provides split line information upon split control bus 104 and asserts a reset signal upon reset line 110.

In check state 152, non-accelerated update detect unit 102 awaits completion of the non-accelerated operation. In this manner, lookahead adders 80 may receive the result of the non-accelerated operation prior to the dispatch of instructions including the ESP as an operand. While the ESP update is pending subsequent to dispatch of a non-accelerated operation, non-accelerated update detect unit 102 remains in state 152 (arc 160). Additionally, subsequent instructions are stalled. Upon indication that the ESP is valid, non-accelerated update detect unit 102 transitions to normal state 150 (arc 158).

It is noted that the state machine shown in FIG. 5 may be eliminated in embodiments which do not employ lookahead adders 80. Instead, cumulative offset generation may be reset upon detection of a non-accelerated operation. Constants may then be generated with respect to the newly detected non-accelerated operation, and a dependency upon the instruction performing the non-accelerated operation may be noted. Upon generation of the result from the non-accelerated operation, the dependent instructions may be executable in parallel.

Figure 6:
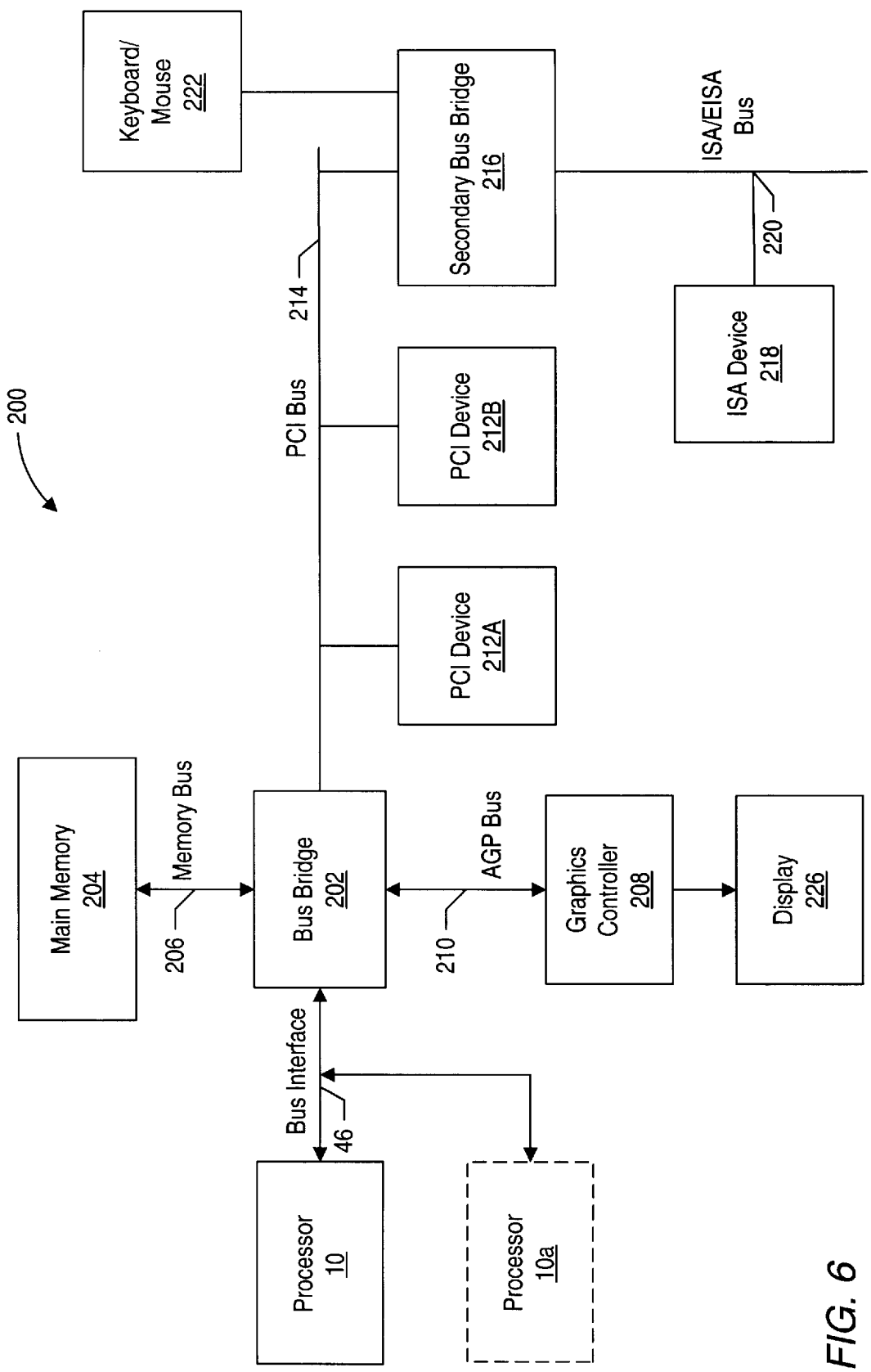
FIG. 6 is a block diagram of one embodiment of a computer system including the processor shown in FIG. 1.

Turning now to FIG. 6, a block diagram of one embodiment of a computer system 200 including processor 10 coupled to a variety of system components through a bus bridge 202 is shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Processor 10 is coupled to bus bridge 202 through bus interface 46.

Bus bridge 202 provides an interface between processor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to bus interface 46 between processor 10 and bus bridge 202 in other embodiments. Alternatively, the external cache may be coupled to bus bridge 202 and cache control logic for the external cache may be integrated into bus bridge 202.

Main memory 204 is a memory in which application programs are stored and from which processor 10 primarily executes. A suitable main memory 204 comprises DRAM (Dynamic Random Access Memory). For example, main memory 204 may comprise a plurality of banks of SDRAM (Synchronous DRAM). Alternatively, main memory 204 may comprise RAMBUS DRAM (RDRAM) or any other suitable DRAM.

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional processors (e.g. processor 10a shown as an optional component of computer system 200). Processor 10a may be similar to processor 10. More particularly, processor 10a may be an identical copy of processor 10. Processor 10a may share bus interface 46 with processor 10 (as shown in FIG. 6) or may be connected to bus bridge 202 via an independent bus.

It is noted that, while in portions of the above disclosure the stack pointer register may be referred to as the ESP register and the base pointer register may be referred to as the EBP register as defined in the x86 instruction set architecture, the present invention is not limited to this architecture. For example, while other architectures may not include an explicit stack pointer register, software may be designed to use a particular general purpose register as a stack pointer register. Embodiments of a processor employing other instruction set architectures and software designed in the above fashion may generate lookahead values for the particular general purpose register. Still flirter, accelerated updates may be detected for any register (e.g. increments and decrements of any register may be accelerated).

Numerous variations and modifications will become apparent to those skilled in the art once the above disclosure is fully appreciated. It is intended that the following claims be interpreted to embrace all such variations and modifications.

What is claimed is:

1. A processor comprising:
    a storage location coupled to a circuit, wherein the storage location is configured to store a cumulative offset indicating a cumulative modification of a first value, wherein the first value is stored into a first register in response to a first non-accelerated operation corresponding to a first prior instruction, and wherein the cumulative modification is due to each instruction between the first prior instruction and a second prior instruction, the second prior instruction processed by the circuit in a first clock cycle; and
    the circuit coupled to receive a first instruction in a second clock cycle subsequent to the first clock cycle, wherein the circuit is configured to update the cumulative offset to reflect a modification due to the first instruction if the first instruction includes a first accelerated operation to the first register, and wherein the circuit is configured to update the cumulative offset to an initial value if the first instruction includes a second non-accelerated operation to the first register, wherein the initial value is independent of instructions executed by the processor.

2. The processor as recited in claim 1 wherein the initial value is a fixed value.

3. The processor as recited in claim 2 wherein the fixed value is zero.

4. The processor as recited in claim 1 wherein the circuit comprises a constant generator configured to generate a constant equal to a sum of the cumulative offset and the modification due to the first instruction, if the first instruction includes the first accelerated operation.

5. The processor as recited in claim 4 wherein the circuit comprises a plurality of constant generators including the constant generator, each of the plurality of constant generators operative on different instructions concurrently provided to the circuit.

6. The processor as recited in claim 4 further comprising a second circuit configured to combine the constant and the first value to form a second value of the first register corresponding to the first instruction.

7. The processor as recited in claim 6 wherein the second circuit is configured to add the constant and the first value.

8. The processor as recited in claim 6 wherein the second circuit is operative on the first instruction prior to execution of the first instruction.

9. The processor as recited in claim 6 wherein the second circuit is operative on the first instruction during execution of the first instruction.

10. The processor as recited in claim 9 wherein the second circuit is further configured to form the second value even if the first instruction includes a non-accelerated operation.

11. The processor as recited in claim 10 wherein the second circuit is configured to cause the second value to be stored in the first register.

12. A method comprising:
    updating a cumulative offset to reflect a modification of a first instruction processed in a first clock cycle if the first instruction includes an accelerated operation to a first register, the cumulative offset indicating a cumulative modification of a first value stored into the first register in response to a first non-accelerated operation corresponding to a first prior instruction, and wherein the cumulative modification is due to each instruction between the first prior instruction and a second prior instruction, the second prior instruction processed in a second clock cycle prior to the first clock cycle; and
    updating the cumulative offset to an initial value if the first instruction includes a second non-accelerated operation to the first register, wherein the initial value is independent of instruction execution.

13. The method as recited in claim 12 wherein the initial value is a fixed value.

14. The method as recited in claim 13 wherein the fixed value is zero.

15. The method as recited in claim 12 further comprising generating a constant equal to a sum of the cumulative offset and the modification due to the first instruction, if the first instruction includes the accelerated operation.

16. The method as recited in claim 15 further comprising combining the constant and the first value to form a second value of the first register corresponding to the first instruction.

17. The method as recited in claim 16 wherein the combining comprises adding the constant and the first value.

18. The method as recited in claim 16 wherein the combining occurs prior to executing the first instruction.

19. The method as recited in claim 16 wherein the combining occurs during an executing of the first instruction.

20. The method as recited in claim 19 further comprising generating the second value even if the first instruction includes a non-accelerated operation during the executing of the first instruction.

21. The method as recited in claim 20 further comprising storing the second value in the first register.

22. A computer system comprising:
   a processor including:
      a storage location coupled to a circuit, wherein the storage location is configured to store a cumulative offset indicating a cumulative modification of a first value, wherein the first value is stored into a first register in response to a first non-accelerated operation corresponding to a first prior instruction, and wherein the cumulative modification is due to each instruction between the first prior instruction and a second prior instruction, the second prior instruction processed by the circuit in a first clock cycle; and
      the circuit coupled to receive a first instruction in a second clock cycle subsequent to the first clock cycle, wherein the circuit is configured to update the cumulative offset to reflect a modification due to the first instruction if the first instruction includes a first accelerated operation to the first register, and wherein the circuit is configured to update the cumulative offset to an initial value if the first instruction includes a second non-accelerated operation to the first register, wherein the initial value is independent of instructions executed by the processor; and
   a peripheral device configured to communicate between said computer system and another computer system.

23. The computer system as recited in claim 22 further comprising a second processor including:
   a second storage location configured to store a second cumulative offset indicating a second cumulative modification of a second value, wherein the second value is stored into a second register in response to a third non-accelerated operation; and
   a second circuit coupled to receive a second instruction, wherein the second circuit is configured to update the second cumulative offset to reflect a second modification due to the second instruction if the second instruction includes a second accelerated operation to the second register, and wherein the second circuit is configured to update the second cumulative offset to a second initial value if the second instruction includes a fourth non-accelerated operation to the second register, wherein the second initial value is independent of instructions executed by the second processor.

24. The computer system as recited in claim 22 wherein said peripheral device comprises a modem.

25. The computer system as recited in claim 22 wherein said peripheral device comprises a network adapter card.

* * * * *